United States Patent [19]

Takeuchi et al.

[11] 4,434,707
[45] Mar. 6, 1984

[54] VACUUM TYPE BRAKE BOOSTER DEVICE FOR VEHICULAR USE

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Ueda, Japan

[21] Appl. No.: 317,011

[22] Filed: Nov. 2, 1981

[30] Foreign Application Priority Data

Nov. 19, 1980 [JP] Japan .................. 55-162832
Apr. 4, 1981 [JP] Japan .................. 56-50816

[51] Int. Cl.³ .................. F15B 9/10; F16J 3/02
[52] U.S. Cl. .................. 91/376 R; 92/98 D; 92/99
[58] Field of Search .................. 91/369 A, 376 R; 92/98 D, 165 PR, 177, 99, 98 R

[56] References Cited

U.S. PATENT DOCUMENTS

| | | | |
|---|---|---|---|
| 1,508,654 | 9/1924 | Hales | 92/98 D |
| 2,707,966 | 5/1955 | Taplin | 92/99 |
| 2,983,256 | 5/1961 | Seeloff | 92/177 |
| 4,238,992 | 12/1980 | Tuck, Jr. | 92/99 X |
| 4,286,501 | 9/1981 | Thomas et al. | 92/165 PR X |
| 4,292,887 | 10/1981 | Ohta et al. | 92/98 D X |

Primary Examiner—Robert E. Garrett
Assistant Examiner—Abram M. Bradley
Attorney, Agent, or Firm—Posnack, Roberts, Cohen & Spiecens

[57] ABSTRACT

A vacuum type brake booster device is provided which comprises a booster shell of substantially elliptical shape in transverse cross section, a booster piston of similar shape as the booster shell and accommodated therein for axial reciprocating movement, and a diaphragm secured about the outer periphery thereof to the booster shell and about the inner periphery to the booster piston to divide the interior of the booster shell into a first working chamber in communication with a vacuum source and a second working chamber adapted to be selectively placed in communication with the first working chamber or the atmosphere by a switching valve. The diaphragm is also shaped substantially elliptically in transverse cross section, and includes a pair of opposite straight peripheral wall sections and a pair of opposite arcuate peripheral wall sections interconnecting the straight wall sections; the arcuate wall sections have a wall thickness greater than that of the straight wall sections.

2 Claims, 8 Drawing Figures

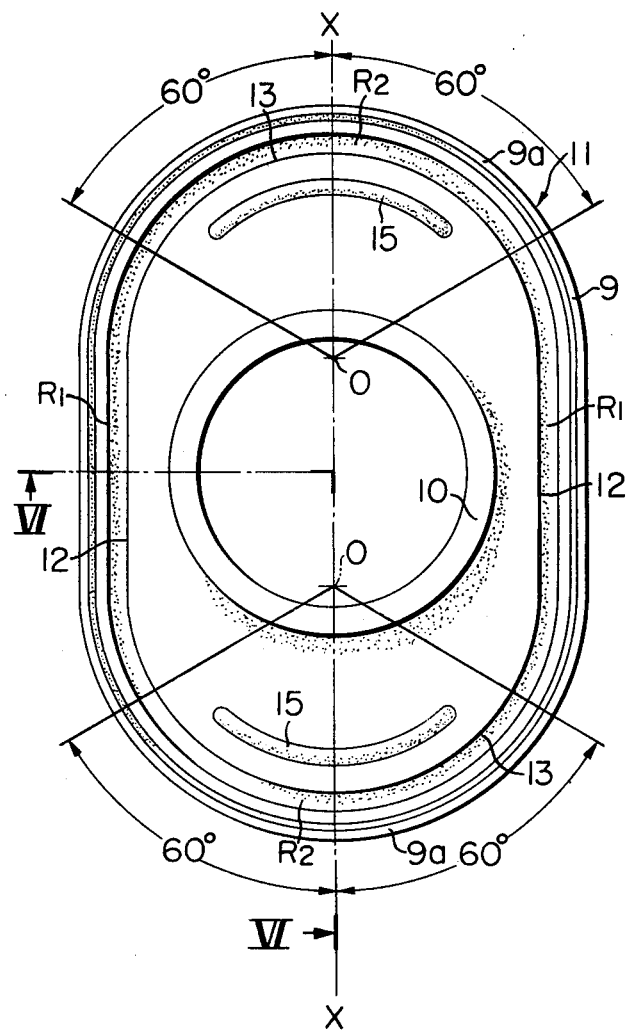
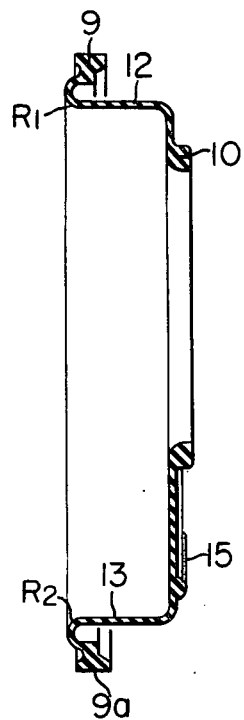
FIG. 5
FIG. 6

VACUUM TYPE BRAKE BOOSTER DEVICE FOR VEHICULAR USE

BACKGROUND OF THE INVENTION

1. Field of the Invention

The present invention relates to vacuum type brake booster devices for vehicular use, designed to operate with the aid of vacuum force principally for actuation of a brake master cylinder in an automotive hydraulic brake system, and more particularly to those of the structure including a booster shell having a brake master cylinder fitted to one end face thereof, an input rod extending through the other end face of the booster shell, and a booster piston accommodated in the booster shell and arranged to actuate the brake master cylinder under the action of the input rod.

2. Description of the Prior Art

With conventional forms of such brake booster device, the booster shell and the booster piston are circular in transverse cross section and, in order to increase the diameter of the booster piston thereby to enhance the capacity of the booster device, the booster shell must necessarily be increased in diameter or radially enlarged, giving rise to the problem of its interference with adjacent vehicle components, such as a clutch master cylinder and an instrument panel, which involves much difficulty in installing the booster.

SUMMARY OF THE INVENTION

Under the circumstances, the present invention seeks to overcome the difficulties previously encountered and has for its object the provision of a new and improved brake booster device of the kind concerned which can be easily installed at a predetermined location without interference with any neighboring members despite its increased capacity.

A specific object of the present invention is to provide a brake booster device of the character described which includes a booster shell of substantially elliptical shape in transverse cross section and a similarly shaped booster piston.

A corollary object of the present invention is to improve the durability of a diaphragm to be sealingly arranged between the booster shell and the booster piston in the booster device of the character described.

According to the present invention, there is provided a vacuum type brake booster device which comprises a booster shell of substantially elliptical shape in transverse cross section, a booster piston of similar shape as the booster shell and accommodated therein for axial reciprocating movement, and a diaphragm sealingly secured to the booster shell and the booster piston, respectively, about the outer and inner peripheries of the diaghragm to divide the interior space of the booster shell into a first working chamber in communication with a vacuum source and a second working chamber adapted to be selectively placed in communication with the first working chamber and the atmosphere by switching valve means.

The above and other objects, features and advantages of the present invention will become apparent from the following detailed description of the invention when taken in conjunction with the accompanying drawings, which illustrate a few preferred embodiments of the invention.

BRIEF DESCRIPTION OF THE DRAWINGS

In the drawings:

FIG. 5 is an enlarged rear view of the diaphragm shown in FIGS. 3 and 4;

FIG. 6 is a cross sectional view taken along line VI—VI in FIG. 5;

DESCRIPTION OF THE PREFERRED EMBODIMENTS

Figure 1:
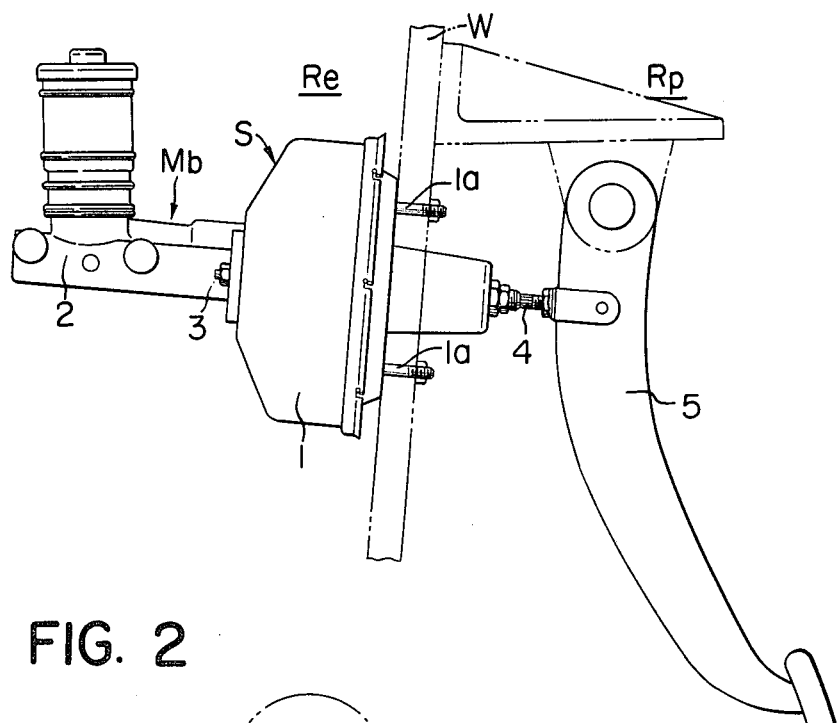
FIG. 1 is a side elevational view of a first preferred embodiment of the present invention.

The present invention will now be described with reference to the accompanying drawings and first to FIGS. 1 and 2, which illustrate a first embodiment of the invention as applied to a front-engine type automobile in which the front engine room or compartment Re is separated from the passenger compartment Rp by a partition wall W, forming part of the car body. Firmly secured by bolts 1a to the front surface of the partition wall W is the booster shell 1 of a vacuum type brake booster S. Secured by bolts 3 to the front face of the booster shell 1 is the body 2 of a brake master cylinder Mb of the well-known, tandem type. Extending rearwardly into the passenger compartment Rp through the rear wall of the booster shell 1 is an input rod 4 to the rear end of which a brake pedal 5 is connected.

Figure 3:
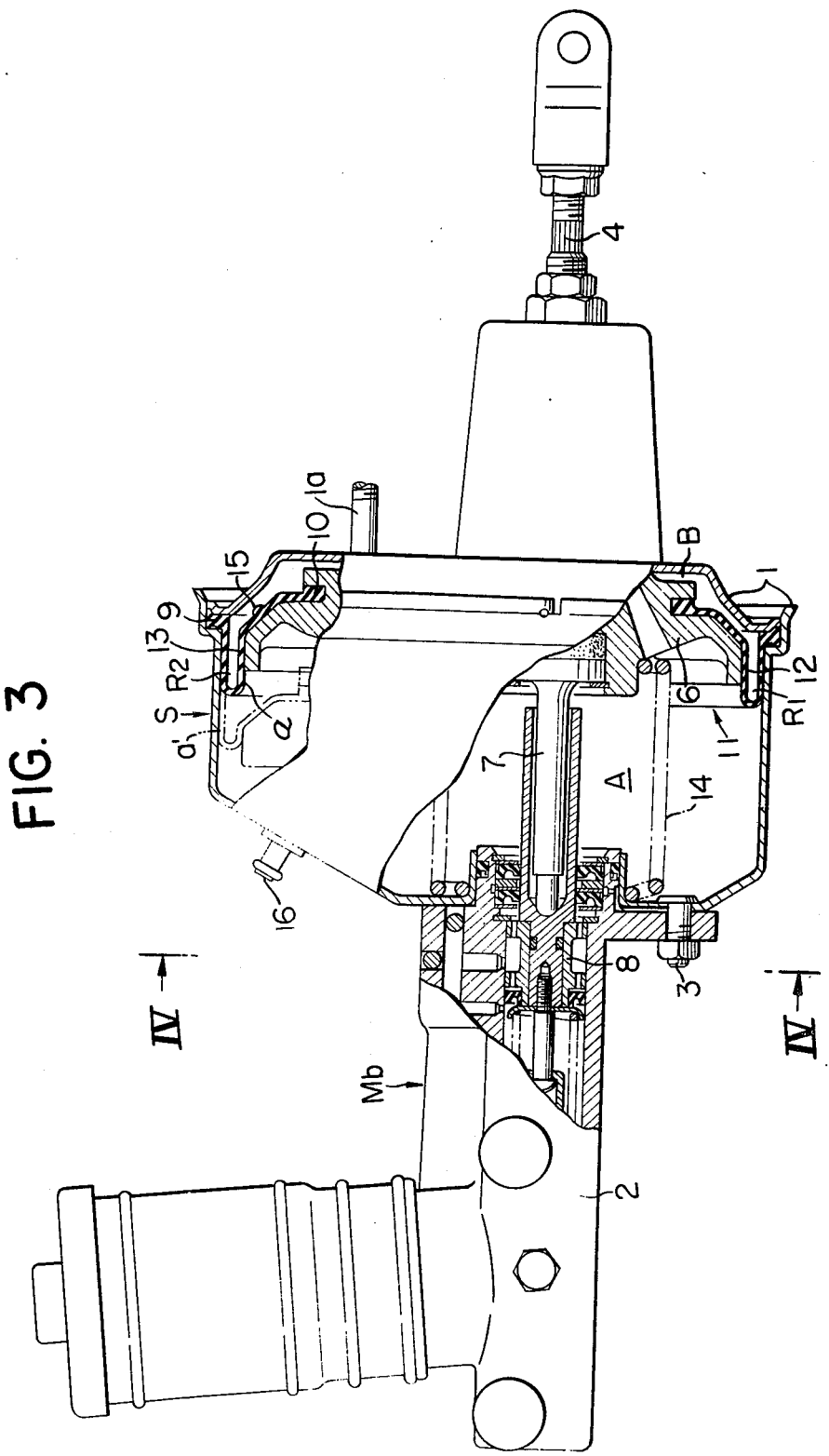
FIG. 3 is an enlarged side elevation of the embodiment shown in FIGS. 1 and 2, illustrating the essential parts thereof, partly in cross section taken along line III—III in FIG. 4.
Figure 4:
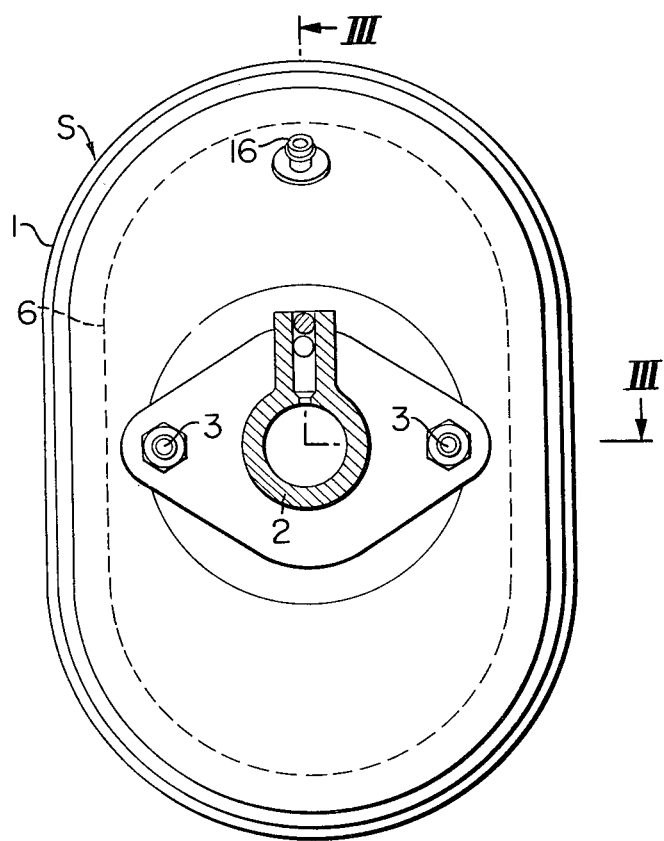
FIG. 4 is a cross-sectional view taken along line IV—IV in FIG. 3.

Referring next to FIGS. 3 and 4, the booster shell 1 is of substantially elliptical or oblong-circular shape in transverse cross section and is positioned with its minor and major axes horizontal and vertical, respectively. A booster piston 6, of similar shape as the booster shell 1 in transverse cross section, is accommodated therein for axial reciprocating movement and is connected with the piston 8 of brake master cylinder Mb through the intermediary of an output rod 7.

The interior space or cavity of the booster shell 1 is divided into a front, first working chamber A and a rear, second working chamber B by a tubular rolling diaphragm 11 which is also of substantially elliptical shape in transverse cross section. The diaphragm 8 has an outer peripheral bead 9 of elliptical form sealingly secured to the booster shell 1 at the junction of its front and rear sections and an inner peripheral bead 10 of circular ring form sealingly secured to the outer peripheral portion of the booster piston 6. Referring also to FIGS. 5 and 6, the diaphragm 11 includes a pair of opposite straight peripheral wall sections 12 and a pair of opposite circularly arcuate peripheral wall sections 13 interconnecting the straight peripheral wall sections 12, which are folded in the respective straight and arcuate regions of the space between the booster shell 1 and booster piston 6 into U-shaped cross-sectional form, thus forming together a series of alternately connected straight and circularly arcuate rolling regions $R_1$ and $R_2$, which allows axial reciprocating movement of the booster piston 6 relative to the booster shell 1. In the first working chamber A, a return spring 14 is provided for the booster piston 6 and is held in compression between the front wall of the booster shell 1 and the booster piston 6 to normally urge the latter axially rearwardly toward the second working chamber B. The rearward movement of the booster piston 6 is limited as raised arcuate ribs 15 formed on the rear end face of the rolling diaphragm 11 come into abutting engagement with the real wall of the booster shell 1.

The first working chamber A is maintained in communication with a vacuum source, e.g., the engine intake manifold, not shown, by means of a vacuum inlet tube 16 extending from the front face of the booster shell 1 and is thus maintained under vacuum all the time during engine operation. On the other hand, the second working chamber B is adapted to be selectively placed in communication with the first working chamber A and the atmosphere by means of a switching control valve, not shown, which is operatively connected with the input rod 4 in a manner well known in the art.

Referring again to FIGS. 5 and 6, the circularly arcuate peripheral wall sections 13 of the rolling diaphragm 11 each extend about the center of curvature O thereof through an arc of the order of sixty degrees on both sides of the longitudinal or major axis X—X of the diaphragm, which passes through the centers of curvature O—O of the respective arcuate peripheral wall sections 13 or the arcuate portions 9a of outer peripheral bead 9 of the diaphragm 11. The arcuate peripheral wall sections 13 are greater in strength than the straight peripheral wall sections 12 due to the greater thickness of sections 13 as compared to that of the sections 12. In the embodiment illustrated, the end wall section of the diaphragm 11 is formed thicker in its opposite sector regions than in the remaining region thereof. It is to be noted, however, that such local increase in thickness of the diaphragm end wall is intended just for convenience of fabrication and is not necessarily required.

The switching valve, not shown, is normally in a position to place the second working chamber B in communication with the first working chamber A to equalize the pressure across the diaphragm 11. With equalized pressure in both the first and second working chambers A and B, the booster piston 6 is held in its retracted position under the bias of return spring 14, as shown in FIG. 3. When, in this state, the brake pedal 5 is depressed to cause the input rod 4 to advance, the swiching control valve is actuated to interrupt communication between the first and second working chambers A and B while allowing atmospheric air to enter into the second working chamber B. As a result, a pressure differential is created across the diaphragm 11 or between the first and second working chambers A and B so that the booster piston 6 is driven forward to drive the piston 8 of brake master cylinder Mb through the intermediary of the output rod 7 whereby the vehicle wheels, not shown, are braked.

Upon such advancing movement of the booster piston 6, the arcuate rolling regions $R_2$ of diaphragm 11 are each caused to roll forwardly from the solid-line position to the dotted-line position in FIG. 3. In this rolling movement, those portions of arcuate rolling regions $R_2$ which are adjacent to the booster piston 6, for example, at point a in FIG. 3, are brought into contact with the inner peripheral wall surface of the booster shell 1 as at point a' so that the arcuate rolling regions $R_2$ are subjected to circumferential tensile force. It is to be noted, however, that there is no danger of the circularly arcuate rolling regions $R_2$ being torn since the circularly arcuate peripheral wall sections 13 of the respective arcuate rolling regions $R_2$ are relatively large in thickness, as described hereinbefore.

Figure 2:
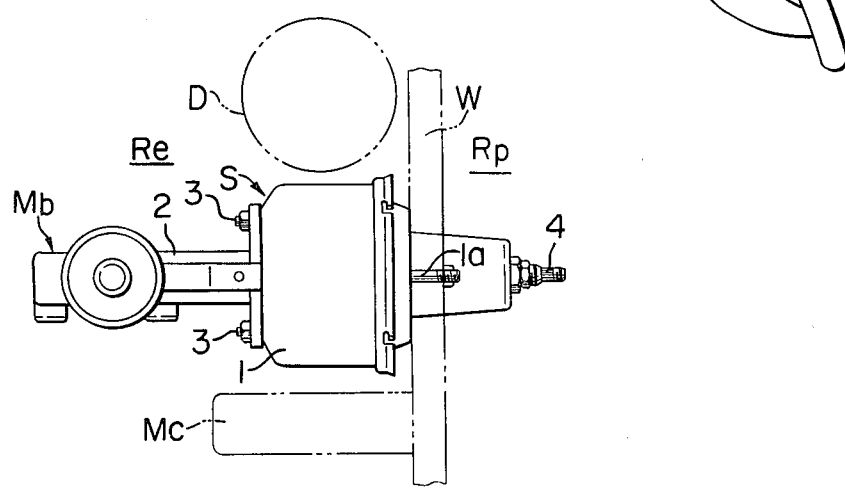
FIG. 2 is a plan view thereof.

As illustrated in FIG. 2, a clutch master cylinder Mc and a right-wheel shock absorber D are disposed adjacent to the booster shell 1 respectively to the left and right thereof, seen in the directions of vehicle travel. As usual in practice, the clutch master cylinder Mc is mounted on the front surface of the partition wall W of the vehicle.

In this connection, it will be appreciated that, since the booster shell 1 and booster piston 6 are of substantially elliptical cross section with their minor axes extending in a horizontal direction, as described hereinbefore, their lengthwise dimensions can be freely increased as required despite the arrangement of clutch master cylinder Mc and shock absorber D on the opposite sides of the booster. This means that the booster device S can be increased in capacity as desired without causing interference with the clutch master cylinder Mc and shock absorber D or necessitating relocation of any of such neighboring components that limit the space available for installation of the device S.

Figure 7:
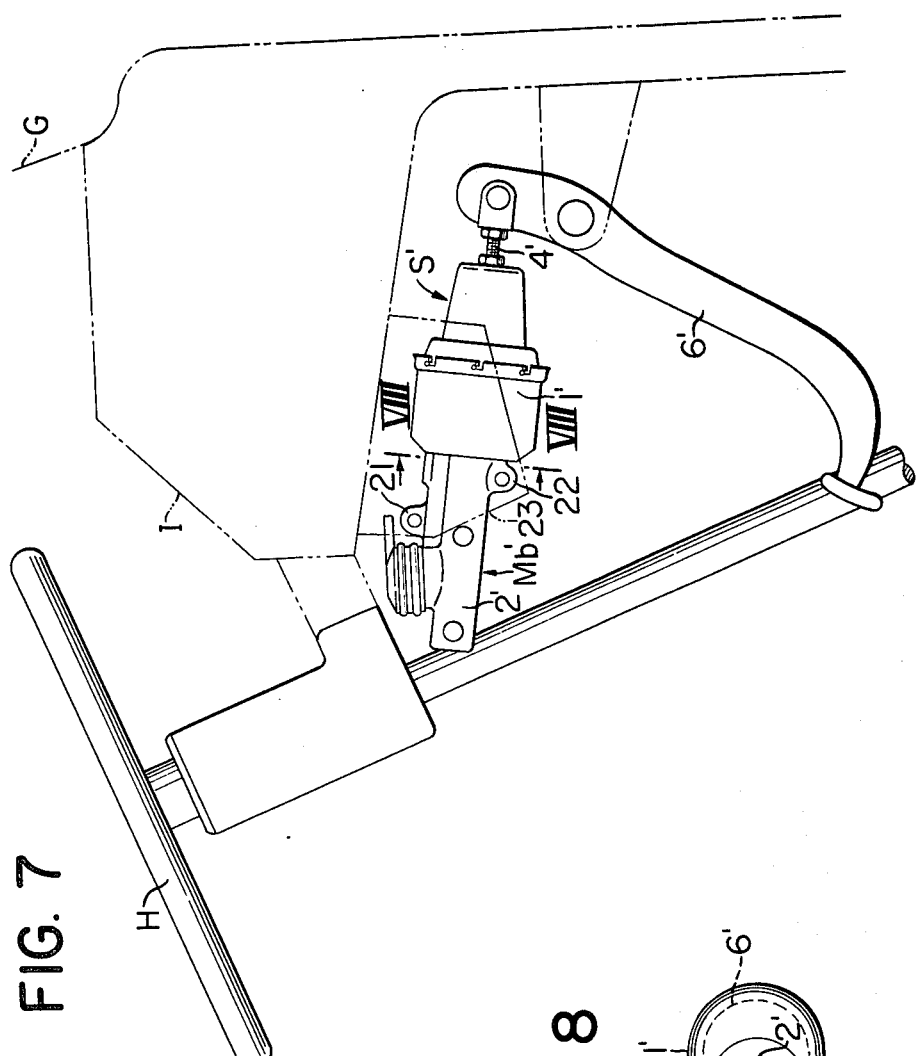
FIG. 7 is a side elevational view of a second preferred embodiment of the present invention.
Figure 8:
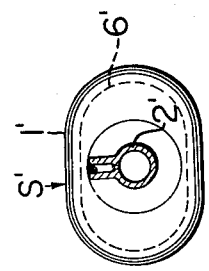
FIG. 8 is a cross sectional view taken along line VIII—VIII in FIG. 7.

FIGS. 7 and 8 are a side elevational and a cross-sectional view of a second preferred embodiment of the present invention as applied to a cab-over type automotive vehicle. As illustrated, the booster device S' includes a booster shell 1' mounted beneath the instrument panel I in the driver's compartment or cab with a brake master cylinder Mb' mounted on the rear face of the booster shell 1'. A brake pedal 5' is connected to an input rod 4' extending forwardly through the front face of booster shell 1'. Connecting bosses 21 and 22 are integrally formed on the body 2' of brake master cylinder Mb' on the top and bottom sides thereof and, by securing these bosses by bolt means to a bracket 23 on the underside, of instrument panel I, the booster S' and brake master cylinder Mb' assembly is supported in place, as illustrated. Reference character G indicates the windshield of the vehicle and H the steering wheel.

The booster device S' is substantially the same in internal structure as the first embodiment, both the booster shell 1' and booster piston 6' accommodated therein being of substantially elliptical or oblong-circular shape in transverse cross section, but unlike the first embodiment, is arranged with the major axes of the booster shell 1' and piston 6' situated horizontally at right angles to the direction of vehicle travel and their minor axes situated substantially vertically. With this arrangement, it will be noted that the lengthwise dimensions of the booster shell 1' and booster piston 6 can be increased as required irrespective of the minimum height of the instrument panel I or booster device S' as measured from the car floor surface. In other words, the booster device S' can be increased in capacity as desired while ensuring an ample space for the driver's pedal operation.

It will be readily appreciated from the foregoing that, owing to the substantially elliptical cross-sectional configuration of the booster shell and the booster piston accommodated therein, the booster device of the present invention can be easily increased in capacity without involving the danger of interfering with neighboring members, as long as it is arranged with its major and minor axes properly directed, and hence is highly valuable as a booster unit to be installed in a strictly limited space on a vehicle.

It will further be appreciated that, according to the present invention, since the circularly arcuate peripheral wall sections of the rolling diaphragm have a thickness larger than that of the straight peripheral wall sections thereof, there is no danger that the circularly arcuate rolling regions of the diaphragm, formed of such arcuate peripheral wall sections, be torn under the circumferential force of tension acting thereon during advancing movement of the booster piston and the durability of such rolling diaphragm is improved to a substantial extent.

What is claimed is:

1. A vacuum type brake booster device for vehicular use comprising a booster shell of substantially elliptical shape in transverse cross-section, a booster piston corresponding in shape to the booster shell and accommodated therein for axial reciprocating movement, and a diaphragm having outer and inner peripheral portions sealingly secured, respectively, to the booster shell and the booster piston so as to divide the interior space of the booster shell into a first working chamber in communication with a vacuum source and a second working chamber adapted to be selectively placed in communication with the first working chamber and the external atmosphere by switching valve means, said diaphragm being of substantially elliptical shape in transverse cross-section and including a pair of opposite straight peripheral wall sections and a pair of opposite arcuate peripheral wall sections interconnecting said straight peripheral wall sections, said arcuate peripheral wall sections having a greater thickness than that of said straight peripheral wall sections, said arcuate peripheral wall sections of said diaphragm each having a rear surface including a raised arcuate rib for abutting engagement with a rear wall of the booster shell.

2. A device as claimed in claim 1 in which said raised arcuate rib extends about the center of curvature of the respective arcuate peripheral wall section through an arc on both sides of the major axis of said diaphragm which passes through the centers of curvature of said respective arcuate peripheral wall sections of said diaphragm.

* * * * *